United States Patent
Kawasaki (10) Patent No.: US 7,150,423 B2
(45) Date of Patent: Dec. 19, 2006

(54) REEL UNIT FOR A DUAL BEARING REEL

(75) Inventor: Ken'ichi Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 141 days.

(21) Appl. No.: 10/927,056

(22) Filed: Aug. 27, 2004

(65) Prior Publication Data

US 2005/0056716 A1 Mar. 17, 2005

(30) Foreign Application Priority Data

Sep. 12, 2003 (JP) ............................. 2003-320665
Feb. 20, 2004 (JP) ............................. 2004-043989

(51) Int. Cl.
*A01K 89/15* (2006.01)
(52) U.S. Cl. ...................................... 242/310; 242/311
(58) Field of Classification Search ................ 242/310, 242/311
See application file for complete search history.

(56) References Cited

U.S. PATENT DOCUMENTS

| 3,603,524 | A | * | 9/1971 | Nurmse et al. | ............. 242/310 |
| 4,821,978 | A | * | 4/1989 | Kaneko | ....................... 242/310 |
| 4,943,012 | A | * | 7/1990 | Aoki | ........................... 242/290 |
| 6,095,444 | A | * | 8/2000 | Miyazaki | ...................... 242/312 |
| 6,409,113 | B1 | * | 6/2002 | Hirayama et al. | .......... 242/310 |
| 6,464,159 | B1 | * | 10/2002 | Nakagawa et al. | ......... 242/310 |
| 2001/0042805 | A1 | * | 11/2001 | Nakagawa et al. | ......... 242/310 |

FOREIGN PATENT DOCUMENTS

| EP | 1155612 A | 11/2001 |
| JP | 2000-125721 A | 5/2000 |
| JP | 2001-045926 A | 2/2001 |

\* cited by examiner

*Primary Examiner*—Kathy Matecki
*Assistant Examiner*—Evan Langdon
(74) *Attorney, Agent, or Firm*—Shinjyu Global IP Counselors, LLP (57) ABSTRACT

A reel unit includes a frame, and first and second cover plates that are detachably mounted on both sides of the frame. The frame includes first and second side plates and a plurality of connectors that connect the first and second side plates. The first side plate includes a plate member and an annular member. The plate member includes a first opening in its inner peripheral portion. The plate member is made of a magnesium alloy, with an electrodeposition treatment being performed on a surface of the plate member. The annular member has a second opening through which the spool is adapted to pass, and a female threaded portion that is formed on an inner peripheral portion of the second opening. The annular member is harder than the surface of the plate member on which the electrodeposition treatment is performed.

14 Claims, 10 Drawing Sheets

REEL UNIT FOR A DUAL BEARING REEL

BACKGROUND OF THE INVENTION

1. Field of the Invention

The present invention relates to a reel unit. More specifically, the present invention relates to a reel unit for a dual bearing reel on which a spool for winding line that is rotated by a handle can be detachably mounted.

2. Background Information

Generally, a dual bearing reel includes a reel unit that is mounted on a fishing rod, a spool that is rotatively mounted on the reel unit, and a handle that serves to rotate the spool. The handle is rotatively mounted on one side of the reel unit, and is connected to the spool via a gear mechanism. The reel unit includes a frame and a pair of side covers. The frame includes a pair of left and right side plates and connection members that connect both of the side plates, and the pair of side covers covers both sides of the frame. An opening through which the spool is capable of passing is provided in the side plate opposite the side plate on which the handle is mounted, and the side cover that covers this side plate is detachably mounted on the side plate in order to make it easy to remove the spool from the opening.

In order to easily attach or detach the side cover with respect to the side plate with this type of dual bearing reel, the side cover is mounted to the side plate by forming a female threaded portion in the inner peripheral side of the opening in the side plate, and a male threaded portion formed on the outer peripheral side of the end of the side cover is screwed therein (see, for example, Japanese Unexamined Patent Publication No. 2000-125721). Here, the side cover can be easily attached and detached by simply rotating the side cover with respect to the side plate.

With this type of dual bearing reel, it has recently been known to form the frame from a magnesium alloy in order to reduce the weight of the dual bearing reel and improve its design. The frame for this type of dual bearing reel is, for example, unitarily formed with side plates and connection members from a magnesium alloy.

With the aforementioned conventional dual bearing reel, the weight of the dual bearing reel can be reduced and the design can be improved because the side plates and the connection members are formed from a magnesium alloy. However, the corrosion resistance of magnesium alloy is weak compared to that of a common metal, and thus an electrodeposition layer is formed by an electrodeposition treatment on the surface of the magnesium alloy in order to improve the corrosion resistance of the surface. If this type of electrodeposition layer is formed on the surface of the female threaded portion that serves to install the male threaded portion of the side cover, the male threaded portion will become stuck in the female threaded portion because the electrodeposition layer has comparatively elastic qualities. Thus, if the male threaded portion is stuck in the female threaded portion, the threaded portions may not properly engage with each other, and the side cover may be coupled to the side plate in an unstable manner.

In view of the above, it will be apparent to those skilled in the art from this disclosure that there exists a need for an improved reel unit for dual bearing reel that overcomes problems of the prior art. This invention addresses this need in the art as well as other needs, which will become apparent to those skilled in the art from this disclosure.

SUMMARY OF THE INVENTION

An object of the present invention is to make it possible to reliably couple a side cover to a side plate of a reel unit of a dual bearing reel.

A dual bearing reel according to the first aspect of the present invention includes a reel unit, a spool, a handle, and a drag adjustment member. The reel unit includes a first side plate that includes a plate member and an annular member, a second side plate that is disposed opposite the first side plate across a gap, a first side cover that is detachably mounted on the first side plate so as to cover an exterior of the first side plate, and a second side cover that is detachably mounted on the second side plate so as to cover the exterior of the second side plate. The plate member includes a first opening in its inner peripheral portion, and is made of a magnesium alloy with an electrodeposition treatment being performed on a surface of the plate member. The annular member includes a second opening and a female threaded portion that is formed on an inner peripheral portion of the second opening. The surface of the annular member is harder than the surface of the plate member on which the electrodeposition treatment is performed. The first side cover has a male threaded portion formed thereon that is capable of engaging with a female threaded portion of the annular member. The spool is detachably mounted between the first and second side plates. The spool passes through the second opening. The handle is mounted to the second side cover to rotate the spool. The drag adjustment member is disposed on the same side of the reel unit as the handle.

With this reel unit, the first side plate includes a plate member made of a magnesium alloy, and an annular member in which a female threaded portion is formed and which is harder than the surface of the plate member on which the electrodeposition treatment is performed. The first side cover includes a male threaded portion that engages with the female threaded portion of the annular member. Here, by forming the annular member and the plate member of the first side plate separately, and by forming the annular member in which the female threaded portion is formed from a metal that is harder than the electrodeposition layer, it will be difficult for the male threaded portion to become stuck in the female threaded portion compared to an arrangement where an electrodeposition layer is formed on the female threaded portion made of a magnesium alloy as in the prior art. Thus, the first side cover can be reliably coupled to the first side plate because the elasticity of the screw components can be reduced.

A dual bearing reel according to the second aspect of the present invention is the dual bearing reel of the first aspect of the present invention, in which the annular member is made of a metal. Here, the male threaded portion can be prevented from becoming stuck in the female threaded portion by forming the annular member from a metal such that the surface of the annular member is harder than the surface of the plate member on which the electrodeposition treatment is performed.

The reel unit dual bearing reel according to the third aspect of the present invention is the dual bearing reel of the second aspect of the present invention, in which the annular member is made of an aluminum alloy. Here, the side plates can be provided with an inexpensive structure by forming the annular member from an aluminum alloy that is a metal which is harder than magnesium on which the electrodeposition is performed.

The dual bearing reel according to the fourth aspect of the present invention is the dual bearing reel of the second or third aspect of the present invention, in which an anodic oxidation treatment is performed on the surface of the annular member. Here, corrosion of the annular member can be prevented by performing an anodic oxidation treatment of an alumite treatment on the surface of the annular member made of, for example, an aluminum alloy. Furthermore, by performing the anodic oxidation treatment described above, durability can be maintained even if the screw components are repeatedly attached and removed, because it will no longer be necessary to form an electrodeposition layer on top of the anodic oxide coating layer.

The dual bearing reel according to the fifth aspect of the present invention is the dual bearing reel of the first aspect of the present invention, in which the annular member is made of a synthetic resin. Here, the formation of the annular member can be simplified, and the overall weight thereof can be reduced.

The dual bearing reel according to the sixth aspect of the present invention is the dual bearing reel of any of the first through fifth aspects of the present invention, in which an electrodeposition treatment is performed on the surface of the plate member after an anodic oxidation treatment is performed thereon. Here, corrosion of the plate member can be reliably prevented by performing the anodic oxidation treatment and the electrodeposition treatment in this order on the surface of the plate member made of a magnesium alloy.

The dual bearing reel according to the seventh aspect of the present invention is the dual bearing reel of any of the first through sixth aspects of the present invention, in which the first side cover is made of a metal. Here, the exterior design can be improved, and the wear resistance of the screw components can be improved, by forming the female screw portion from a metal.

The dual bearing reel according to the eighth aspect of the present invention is the dual bearing reel of the seventh aspect of the present invention, in which the first side cover is at least partially made of an aluminum alloy. Here, the formation of the male threaded portion of the first side cover can be simplified, and an inexpensive structure can be provided.

The dual bearing reel according to the ninth aspect of the present invention is the dual bearing reel of the seventh or eighth aspect of the present invention, in which an anodic oxidation treatment is performed on the surface of the first side cover. Here, corrosion of the first side cover can be prevented by performing an anodic oxidation treatment or an alumite treatment on the surface of the first side cover that is made from, for example, an aluminum alloy.

The dual bearing reel according to the tenth aspect of the present invention is the dual bearing reel of one of the seventh through ninth aspects of the present invention, in which the first side cover further includes an exterior member that covers an exterior of the first side plate, and an interior member that is provided separately from the exterior member and which includes the male threaded portion.

The dual bearing reel according to the eleventh aspect of the present invention is the dual bearing reel of the tenth aspect of the present invention, in which the exterior member is made of a synthetic resin, and the interior member is made of an aluminum alloy. Here, durability can be maintained by forming the male screw portion from an aluminum alloy, and at the same time, the weight of the reel unit can be reduced and the workability thereof improved by forming the other components from a synthetic resin.

The dual bearing reel according to the twelfth aspect of the present invention is the dual bearing reel of the tenth aspect of the present invention, in which the exterior member is made of a magnesium alloy, and the interior member is made of an aluminum alloy. Here, durability can be maintained by forming the male screw portion from an aluminum alloy, and at the same time, the weight of the reel unit can be reduced and the design improved by forming the other components from a magnesium alloy.

The dual bearing reel according to the thirteenth aspect of the present invention is the dual bearing reel of any of the first through twelfth aspects of the present invention, in which the annular member is mounted to the plate member with a bolt member. Here, the annular member will be easily mounted to the plate member.

The dual bearing reel according to the fourteenth aspect of the present invention is the dual bearing reel of the thirteenth aspect of the present invention, in which the annular member includes a plurality of attachment portions that is formed to project radially outward, a through hole being formed in each of the attachment portions, and the plate member includes a plurality of nut portions that communicates with the through holes of the attachment portions, the bolt member engaging at least one of the nut portions and at least one of the through holes. Here, when for example a centrifugal brake mechanism or the like is accommodated in the inner peripheral side of the annular member, by forming attachment portions that are composed of a plurality of tabs on the outer peripheral side of the annular member, the attachment portions do not interfere with these mechanisms.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

According to the present invention, the side cover can be reliably coupled to a side plate of a reel unit of a dual bearing reel by forming an annular member that has a female threaded portion in a first side plate, the female threaded portion being formed with a hardened electrodeposition layer, and by forming a separate plate member from a magnesium alloy.

OVERALL CONFIGURATION

Figure 1:
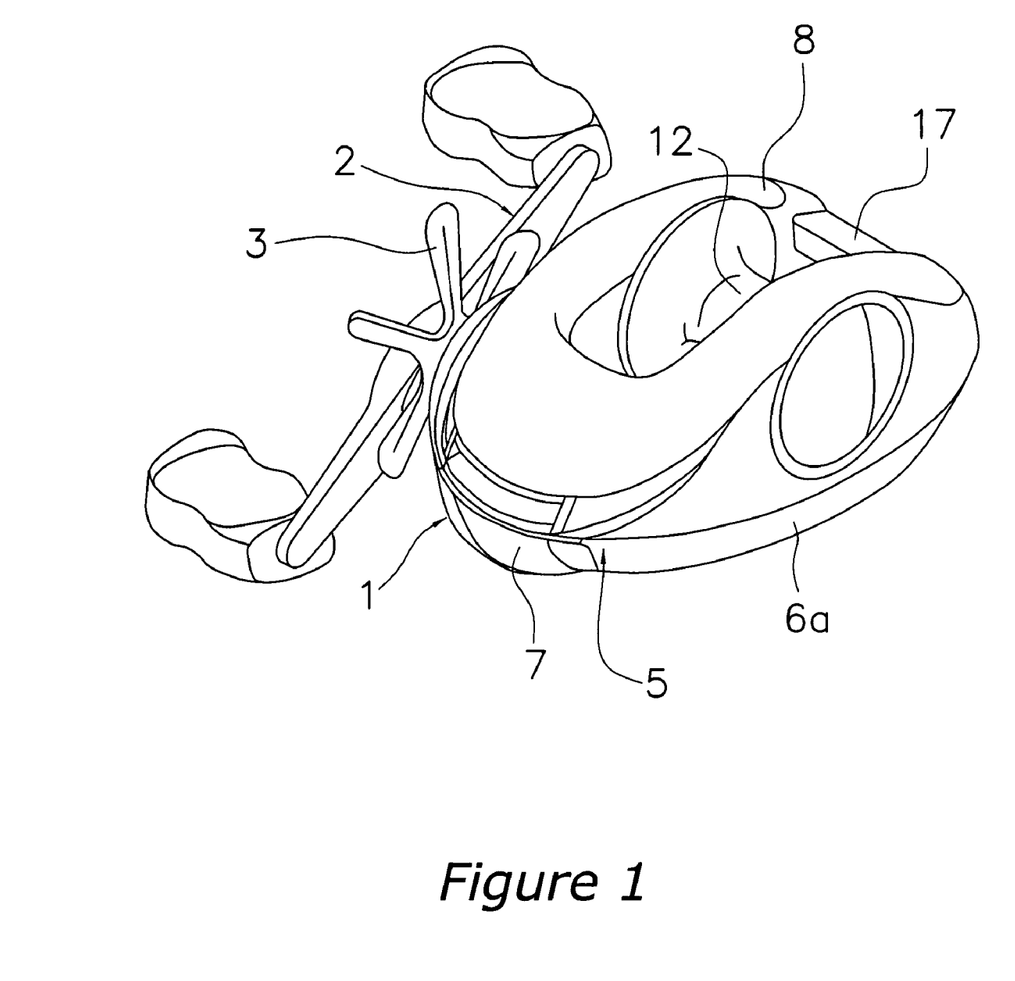
FIG. 1 is a perspective view of a dual bearing reel in accordance with an embodiment of the present invention.

As shown in FIG. 1, a dual bearing reel according to an embodiment of the present invention has a low profile and is used for bait casting. This dual bearing reel includes a reel unit 1, a handle 2 that rotates a spool 12 and is disposed on a side of the reel unit 1, and a star drag (an example of the drag adjustment member) 3 for adjusting drag. The star drag 3 is disposed on the same side of the reel unit 1 as the handle 2.

Figure 2:
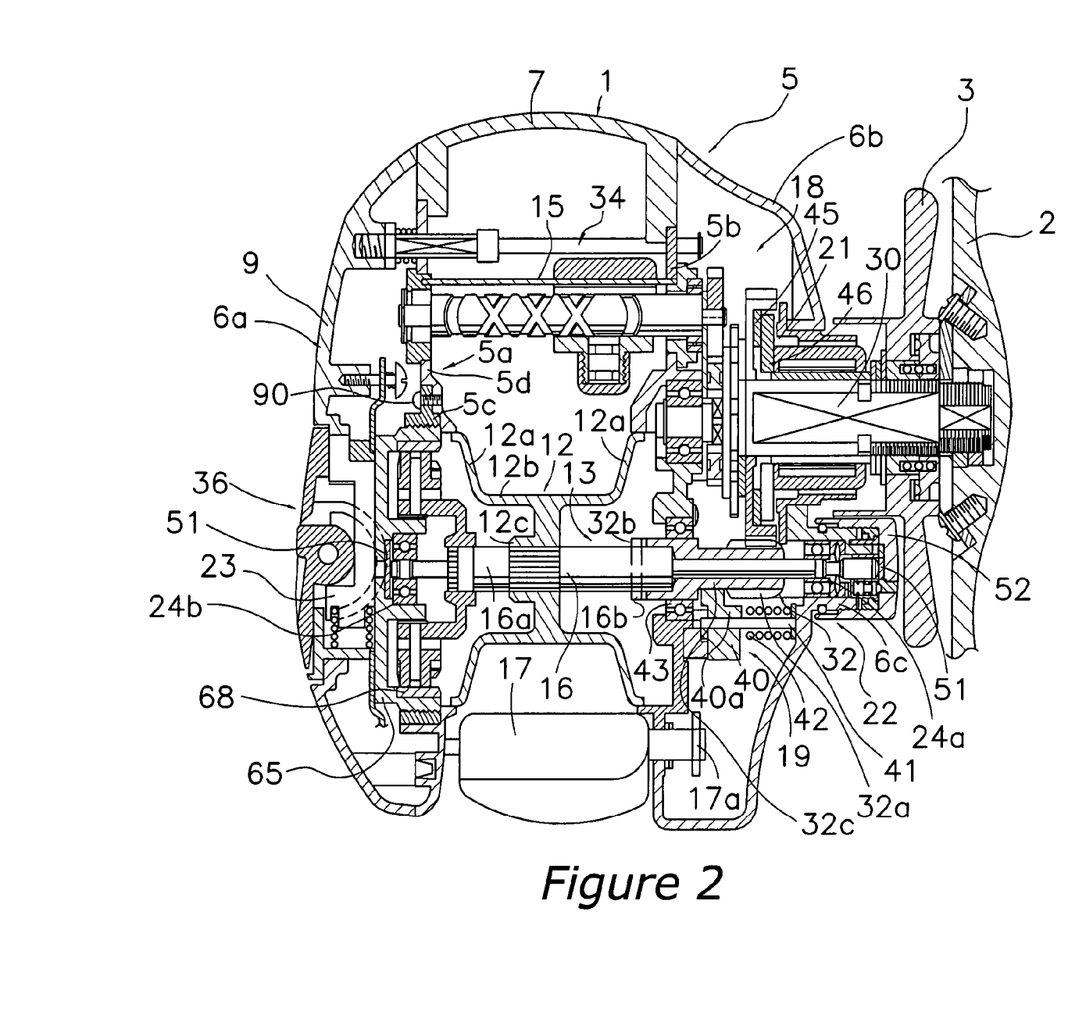
FIG. 2 is a cross-sectional view of the dual bearing reel in accordance with the embodiment of the present invention.

As shown in FIG. 2, the reel unit 1 has a frame 5, and a first side cover 6a and a second side cover 6b that are mounted to both sides of the frame 5. As shown in FIG. 1 and FIG. 2, the reel unit 1 also has a front cover 7 that covers the front side and a thumb rest 8 that covers the upper side. The spool 12 for winding fishing line is rotatively and removably mounted in the interior of the reel body 1.

The frame 5 includes a first side plate 5a and a second side plate 5b that are disposed such that they are opposite each other across a predetermined gap, and a plurality of connectors that connects the first side plate 5a and second side plate 5b.

Figure 3:
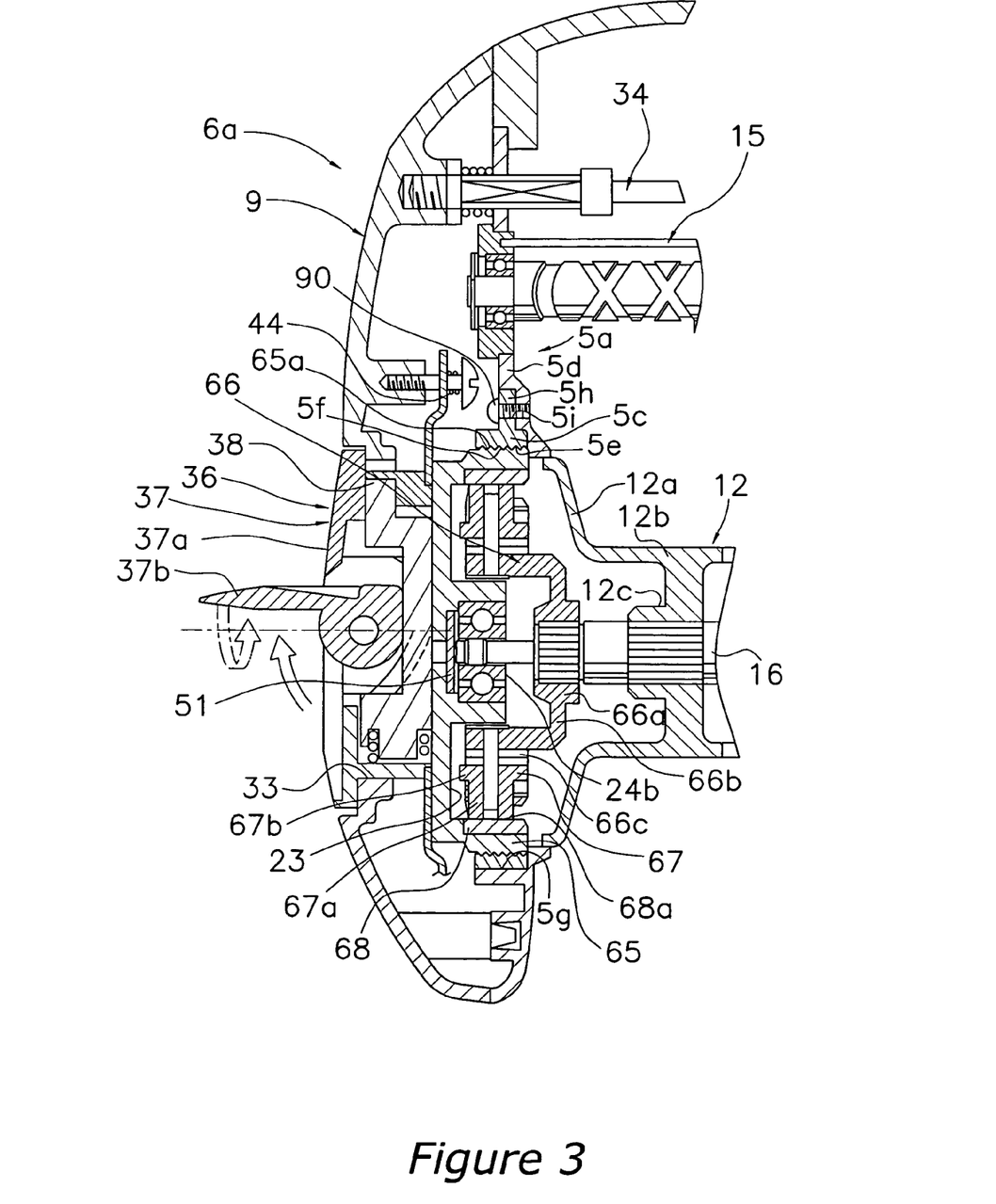
FIG. 3 is an enlarged cross-sectional view of the area around a first side plate in accordance with the embodiment of the present invention.

As shown in FIG. 3, the first side plate 5a includes an annular member 5c made of an aluminum alloy and a plate member 5d that is made of a magnesium alloy. The annular member 5c has a second opening 5e though which the spool 12 can pass through and a female threaded portion 5f that is formed in the inner peripheral portion of the second opening 5e. The plate member 5d has a first opening 5g on the inner peripheral side thereof, such that the annular member 5c is detachably mounted. The surface of the annular member 5c is treated with an alumite treatment. The surface of the plate member 5d is treated with an anodic oxidation treatment and an electrodeposition treatment, in this order.

Figure 4:
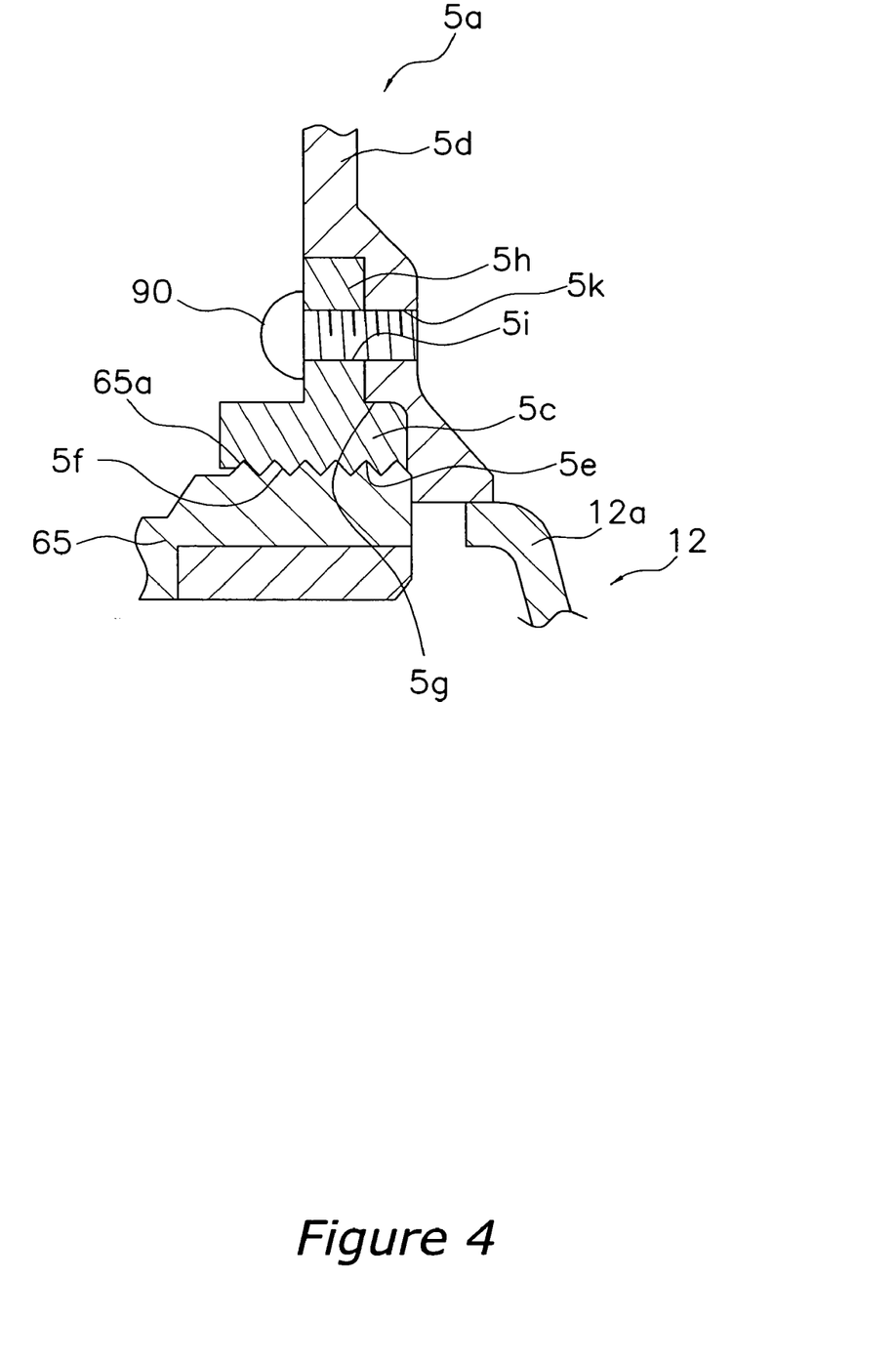
FIG. 4 is an enlarged cross-sectional view of an annular member and a plate member in accordance with the embodiment of the present invention.

As shown in FIGS. 3 and 4, the female threaded portion 5f of the annular member 5c can be screwed together with a male threaded portion 65a formed on the outer periphery of a brake case 65 (described below), which is part of the first side cover 6a. Here, the first side cover 6a can be fixedly coupled to the first side plate 5a by screwing the male threaded portion 65a of the brake case 65 into the female threaded portion 5f of the annular member 5c.

Figure 5:
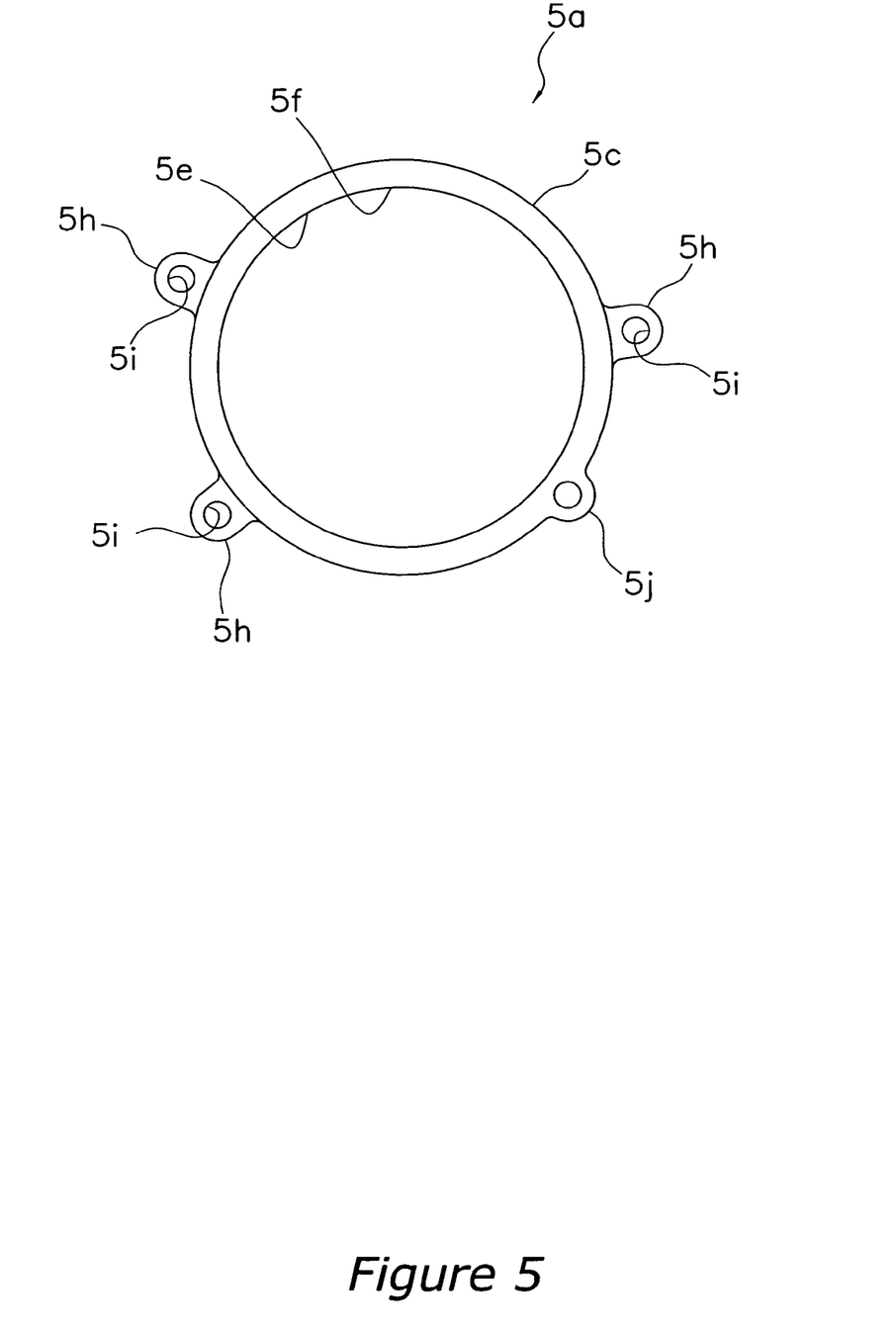
FIG. 5 is a lateral view of the annular member in accordance with the embodiment of the present invention.

As shown in enlarged views in FIGS. 4 and 5, the annular member 5c includes three attachment portions 5h that are formed to project radially outward toward the outer peripheral side, and have through holes 5i formed in the interior of each of the attachment portions 5h. The plate member 5d includes a plurality of female threaded portion 5k (see FIG. 4) that communicates with the through holes 5i of the attachment portions 5h. In other words, the male threaded portions of bolt members 90 (see FIGS. 2 and 4) are screwed into the female threaded portions 5k and the through holes 5i. Here, the annular member 5c is fixedly coupled to the plate member 5d with three bolt members 90. In addition, a positioning portion 5j that serves to position the annular member 5c is formed in one location on the outer peripheral side of the annular member 5c, such that a projecting portion of the plate member 5d (not shown in the figures) engages with the positioning portion 5j to position the annular member 5c.

The first side cover 6a can be opened or closed with respect to the frame 5, and is mounted pivotally to the frame 5 to make it possible to attach and detach the spool 12. As shown in FIG. 2, the first side cover 6a includes an first external cover 9, a pivot mechanism 34, a lock mechanism 36 for opening and closing the first external cover 9, and a brake cover 65. In this embodiment, the first external cover 9 is made of an aluminum alloy, and an anodic oxidation treatment is performed on a surface of the first external cover 9. The pivot mechanism 34 pivotably supports the first side cover 6a on the frame 5, and also supports the first side cover 6a so that it can move away from the frame 5. The lock mechanism 36 serves to lock the first side cover 6a in the closed state and unlock the same therefrom. As shown in FIG. 3, the lock mechanism 36 includes an operation portion 37 that is mounted in an opening 33 formed in the first external cover 9, and a lock member 38 that is mounted on the operation portion 37 so as to be extended and withdrawn in the radial direction. The operation portion 37 includes an operation unit 37a that is mounted both rotatively in the opening 33 and movably in the axial direction therein, and an operating knob 37b that is mounted such that it can pivot around an axis that extends in the radial direction of the operation unit 37a. In other words, the operating knob 37b can pivot around an axis that extends in a direction perpendicular to the paper plane of FIG. 3, as well as an axis shown as a dotted line in FIG. 3.

The operation unit 37a is an approximately tubular member, and is biased toward the first external cover 9 by a coil spring 44. The closed-end tubular brake case 65 (an example of the interior member, where the first external cover 9 of the present embodiment is the external member) of a centrifugal brake mechanism (described below) is fixedly coupled to the operation unit 37a with screws. The brake case 65 includes the male threaded portion 65a that is formed in the outer periphery thereof, and as noted above, is detachably mounted in the female threaded portion 5f formed in the annular member 5c of the first side plate 5a.

Figure 6:
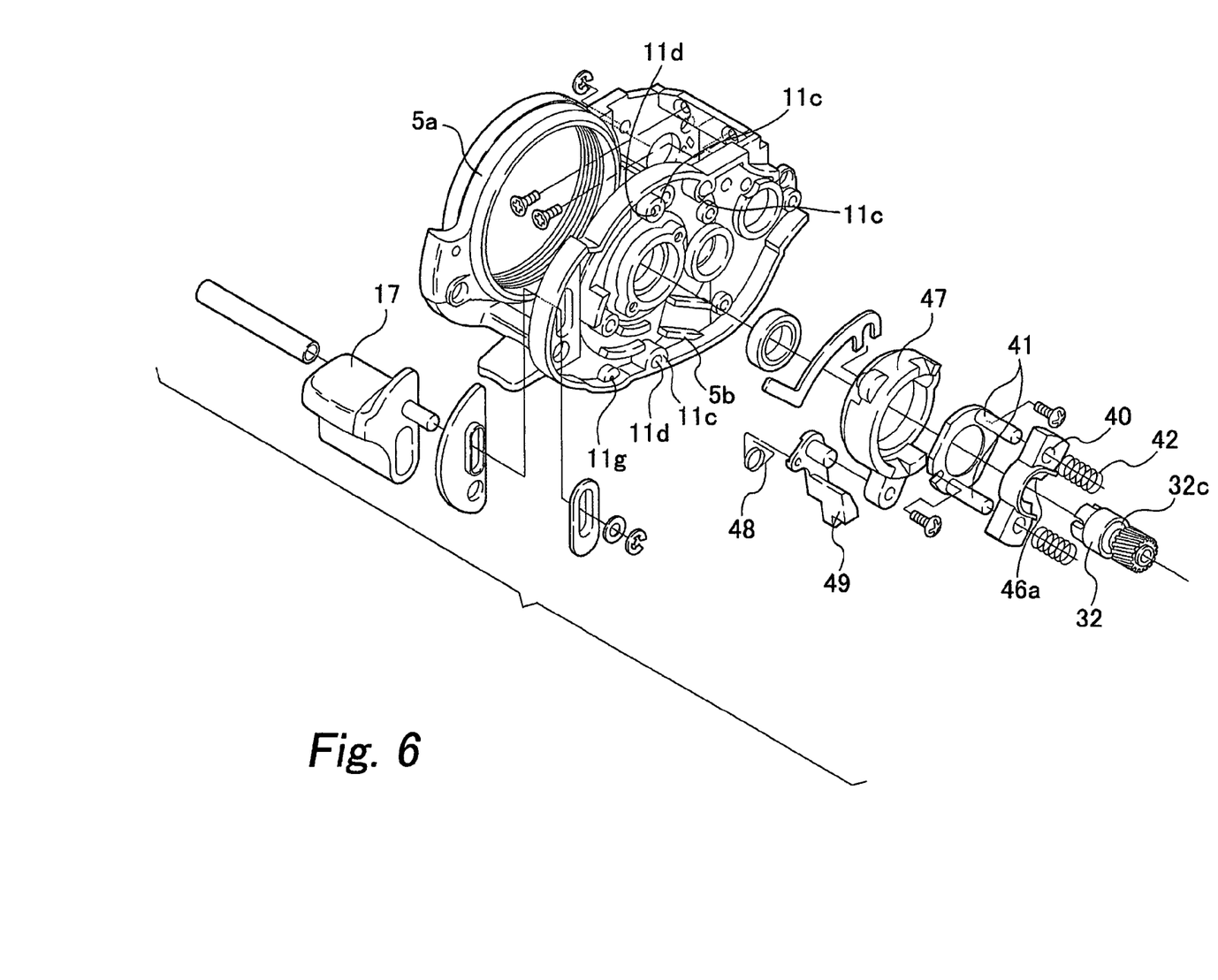
FIG. 6 is an exploded perspective view of a reel unit in accordance with the embodiment of the present invention.

As seen in FIG. 6, the peripheral edge of the second side plate 5b is trimmed so as to project outward in the axial direction, and a plurality of boss portions 11c are formed on the outer peripheral side of the trimmed peripheral edge in a spaced relationship in the circumferential direction. Screw holes 1d are formed in the ends of the boss portions 11c. In addition, as shown in FIG. 6, a through hole 11g is formed in the lower portion of the second side plate 5b in a position that is offset downward. A mounting member 50 is mounted in the through hole 11g in order to install a spring member 48 of a clutch operation mechanism 19 (described below).

Figure 8:
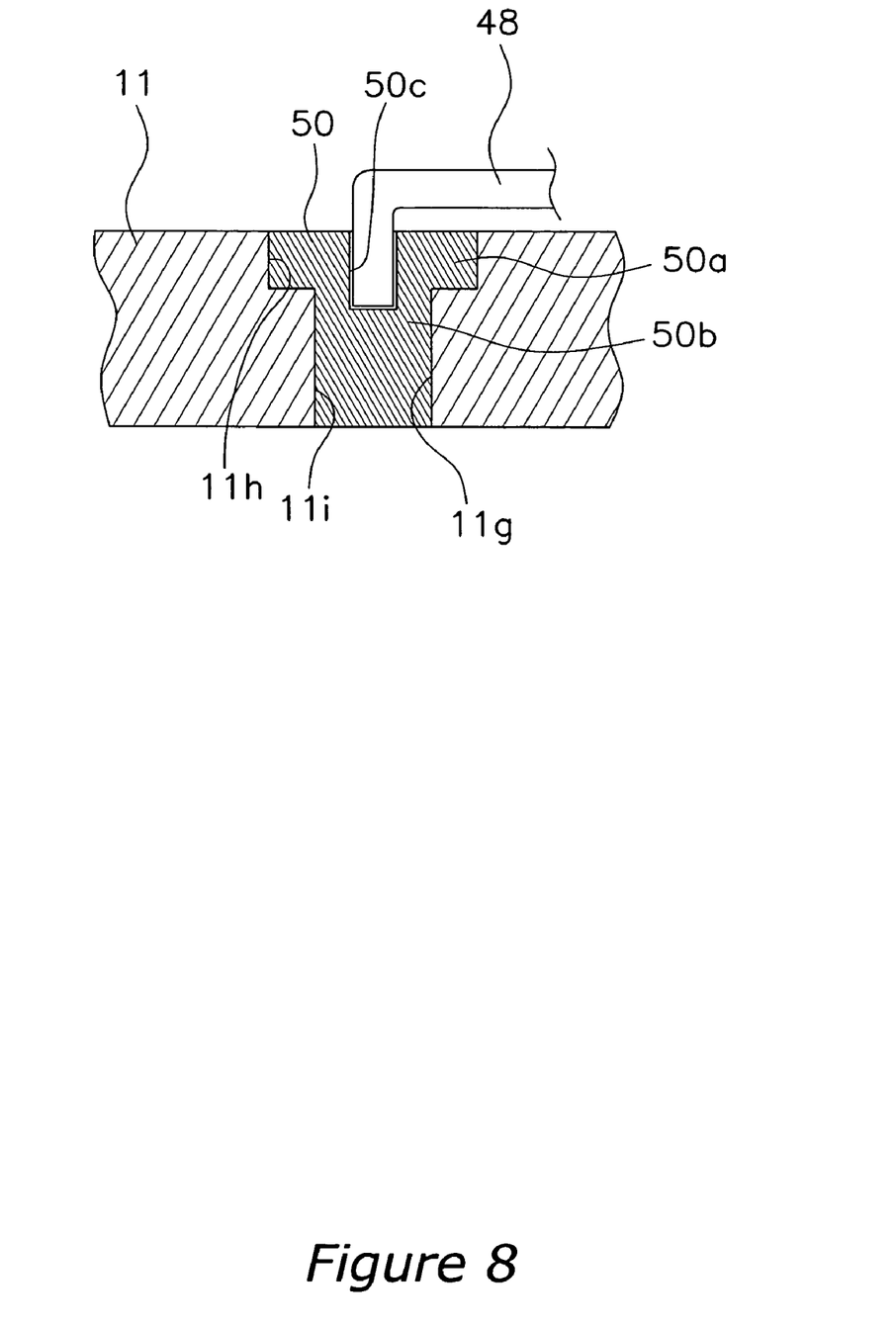
FIG. 8 is an enlarged cross-sectional view of the area around the mounting member in accordance with the embodiment of the present invention.

As shown in an enlarged view in FIG. 8, the screw hole 11g is a stepped recessed portion formed to pass through the second side plate 5b. The through hole 11g includes a large diameter portion 11h that is formed to have a large diameter and in which the mounting member 50 is mounted, and a small diameter portion 11i that communicates with the large diameter portion 11h and is formed to have a diameter that is smaller than that of the large diameter portion 11h. The large diameter portion 11h and the small diameter portion 11*i* are formed, for example, by performing the cutting operation twice with different drill diameters.

Figure 7:
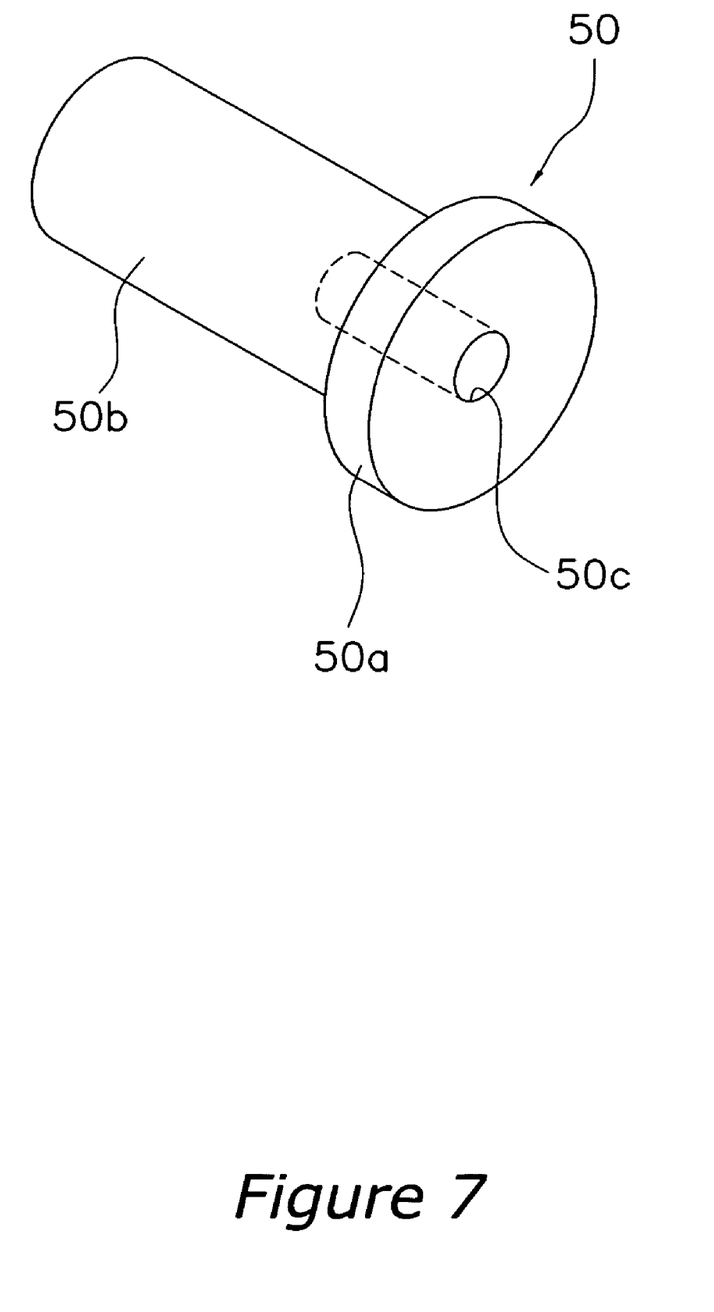
FIG. 7 is an enlarged perspective view of a mounting member in accordance with the embodiment of the present invention.

As shown in FIGS. 7 and 8, the mounting member 50 is a stepped column member that is formed separately from the second side plate 5*b*. As shown in FIGS. 6 and 7, the mounting member 50 includes a head portion 50*a* that is formed to have a large diameter, a waist portion 50*b* that is formed to have a diameter that is smaller than that of the head portion 50*a*, and a mounting recess 50*c* that extends from the head portion 50*a* to the waist portion 50*b*. The mounting recess is formed to be a very small hole and have a diameter smaller than that of the through hole 11*g*.

As shown in FIG. 8, the head portion 50*a* is formed so as to have approximately the same diameter and the same length in the axial direction as those of the large diameter portion 11*h*. The waist portion 50*b* is formed so as to have approximately the same diameter as that of the small diameter portion 11*i*, and is formed to have approximately the same length in the axial direction as or shorter than that of the small diameter portion 11*i*. Because of this, when the mounting member 50 is mounted in the through hole 11*g*, the upper surface of the head portion 50*a* is flush with the surface of the second side plate 5*b*.

The mounting recess 50*c* is a recessed portion that is open on the upper surface of the head portion 50*a*, and allows a bent end portion of the spring member 48 (described below) to be inserted therein. The mounting recess 50*c* is formed so as to have a diameter smaller than those of the large diameter portion 11*h* and the small diameter portion 11*i*. In addition, because the mounting recess 50*c* is formed so as to be a very small hole, the end portion of the comparatively small spring member 48 can be mounted therein.

In installing the mounting member 50 described above, the electrodeposition (described below) is first performed on the frame 5 of which the second side plate 5*b* forms a part of. Then, an adhesive is added to the through hole 11*g* before the mounting member 50 is inserted and fixedly mounted therein. Here, by mounting the mounting member 50 in the through hole 11*g* after the electrodeposition is performed on the second side plate 5*b*, it will become difficult for the mounting recess 50*c* (which is a very small hole having a small diameter) to be filled with paint.

As shown in FIG. 2, the spool 12, a level wind mechanism 15 and a clutch lever 17 are disposed inside the frame 5. The spool 12 is disposed perpendicular to a fishing rod. The level wind mechanism 15 serves to uniformly wind fishing line around the spool 12. The clutch lever 17 is where the thumb is to be placed when thumbing the fishing line. In addition, a gear mechanism 18, a clutch mechanism 13, a clutch engage/disengage mechanism 19, a drag mechanism 21, and a casting control mechanism 22 are disposed in the space between the frame 5 and the second side cover 6*b*. The gear mechanism 18 transmits rotational force from the handle 2 to the spool 12 and the level wind mechanism 15. The clutch engage/disengage mechanism 19 serves to engage and disengage the clutch mechanism 13 and control the same in response to the operation of the clutch lever 17. The casting control mechanism 22 serves to regulate the resistance that develops when the spool 12 rotates. In addition, a centrifugal braking mechanism 23 for preventing backlash during casting is disposed between the frame 5 and the first external cover 9.

As shown in FIG. 3, the spool 12 includes a tubular bobbin 12*b* that is mounted on a spool shaft 16 and around the outer periphery of which fishing line is wound, and flange portions 12*a* that are provided on each end of the bobbin 12*b* and project outward in the radial direction. The bobbin 12*b* is made from an aluminum alloy, and includes a boss portion 12*c* of which the inner periphery thereof is mounted on the spool shaft 16, and a tubular portion 12*d* that is integrally formed with the boss portion 12*c* such that the fishing line is wound around the outer periphery of the tubular portion 12*d*.

As shown in FIG. 2, the spool shaft 16 passes through the second side plate 5*b* and extends out from the second side cover 6*b*. The end of the spool shaft 16 that extends out from the second side cover 6*b* is rotatably supported by a bearing 24*a* in a boss 6*c* formed extending out from the second side cover 6*b*. In addition, the other end of the spool shaft 16 is rotatably supported by a bearing 24*b* within the centrifugal braking mechanism 23. These bearings 24*a*, 24*b* are sealed ball bearings.

The right end of a large diameter portion 16*a* of the spool shaft 16 is disposed at the position where the spool shaft 16 passes through the second side plate 5*b*, as seen in FIG. 2. An engagement pin 16*b* that forms a part of the clutch mechanism 13 is fixedly coupled onto the spool shaft 16 at this location. The engagement pin 16*b* passes through the large diameter portion 16*a* along its diameter and projects radially from both radial sides of the large diameter portion 16*a*.

Referring to FIG. 2, the gear mechanism 18 includes a handle shaft 30, a main gear 31 fixedly mounted to the handle shaft 30, and a tubular pinion gear 32 that meshes with the main gear 31. The vertical position of the handle shaft 30 of this gear mechanism 18 is lower than the conventional position in order to lower the height of the thumb rest 8. Thus, lower portions of the second side plate 5*b* and the second side cover 6*b*, where the gear mechanism 18 is accommodated, are positioned below the lower portion of the first side plate 5*a* and the first side cover 6*a*. In other words, as seen in FIG. 1, the second side plate 5*b* and the second side cover 6*b* are disposed closer to the fishing rod than the first side plate 5*a* and the first side cover 6*a* are, when the double bearing reel is mounted to the fishing rod.

As shown in FIG. 2, the pinion gear 32 that extends inward from outside the second side plate 5*b* is a tubular component through the center of which the spool shaft 16 passes through, and is mounted to the spool shaft 16 so as to be relatively moveable in the axial direction. In addition, the left end (in FIG. 2) of the pinion gear 32 is rotatably and axially movably supported on the second side plate 5*b* by a bearing 43. This bearing 43 is also a sealed ball bearing.

The pinion gear 32 has gear teeth 32*a*, an engagement portion 32*b*, and a constricted portion 32*c*. The gear teeth 32*a* are formed on the outer peripheral portion of the pinion gear 32 on the right end thereof (in FIG. 2) and mesh with the main gear 31. The engagement portion 32*b* is formed on the other end of the pinion gear 32. The constricted portion 32*c* is formed between the gear teeth 32*a* and the engagement portion 32*b*. The engagement portion 32*b* includes a groove that is formed in the end surface of the pinion gear 32 along the diameter thereof. The engagement pin 16*b* which passes through the spool shaft 16 and is fixedly mounted thereto is engaged with the engagement portion 32*b*. When the pinion gear 32 is moved outward and the engagement portion 32*b* and the engagement pin 16*b* of the spool shaft 16 are uncoupled, the rotational force from the handle shaft 30 is not transmitted to the spool 12. The engagement portion 32*b* and the engagement pin 16*b* form the clutch mechanism 13. When the engagement pin 16*b* and the engagement portion 32*b* are engaged, then torque from the handle shaft 30 is transmitted directly from the pinion gear 32 (having a diameter larger than that of the spool shaft 16) to the spool shaft 16 so that torsional deformations are reduced and the torque transmission efficiency is improved.

As shown in FIG. 2, the clutch lever 17 is disposed at the rear end between the first side plate 5a and the second side plate 5b and at the rear of the spool 12.

As shown in FIGS. 2 and 6, the clutch engage/disengage mechanism 19 includes the clutch lever 17, a clutch plate 47, a clutch yoke 40, and the spring member 48, which are disposed in the space between the frame 5 and the second side cover 6b. The clutch plate 47 rotates from the engaged position to the disengaged position by a downward shifting of the clutch lever 17, and returns from the disengaged position to the engaged position through a clutch return mechanism (not shown). The spring member 48 is a torsion coil spring. One end of the spring member 48 is connected to a clutch claw 49 that is included in the clutch return mechanism and is pivotably connected to the clutch plate 47, while the other end of the spring member 48 is engaged with the mounting recess 50c of the mounting member 50 mounted in the through hole 11g of the second side plate 5b. In this manner, the spring member 48 urges the clutch plate 47 toward the engaged position and the disengaged position via the clutch claw 49.

The clutch yoke 40 is disposed on the outer peripheral side of the spool shaft 16, and is supported by two pins 41 so as to be movable in a direction that is parallel to the axis of the spool shaft 16. In addition, the clutch yoke 40 includes an engagement portion 40a on the central portion thereof that engages with the constricted portion 32c of the pinion gear 32. Moreover, springs 42 are disposed around the outer periphery of the pins 41 that support the clutch yoke 40, between the clutch yoke 40 and the second side cover 6b. The clutch yoke 40 is constantly biased inward by the springs 42.

With this configuration, in the ordinary state, the pinion gear 32 is positioned in an inward clutch-engaged position, which is a clutch-on state where the engagement portion 32b and the engagement pin 16b of the spool shaft 16 are engaged. On the other hand, when the pinion gear 32 is shifted outward by the clutch yoke 40, the engagement portion 32b and the engagement pin 16 are disengaged and assume a clutch-off state.

The drag mechanism 21 includes a friction plate 45 that is pressed against the main gear 31, and a pressure plate 46 that presses the friction plate 45 against the main gear 31 with a predetermined amount of pressure when the star drag 3 is rotated.

The casting control mechanism 22 includes a plurality of friction plates 51 and a braking cap 52. The friction plates 51 are disposed on both ends of the spool shaft 16. The braking cap 52 serves to adjust the force with which the friction plates 51 are pressed against the spool shaft 16. The left friction plate 51 is mounted inside the brake case 65.

With this type of dual bearing reel, the first side plate 5a includes the annular member 5c that is made of an aluminum alloy and has the female threaded portion 5f. The first side plate 5a also includes a plate member 5d that is a separate member from the annular member 5c and is made of a magnesium alloy. The first side cover 6a is fixedly mounted to the first side plate 5a by screwing the male threaded portion 65a of the brake case 65 connected to the first side cover 6a onto the female threaded portion 5f of the annular member 5c. Here, the female threaded portion 5f of the annular member 5c is formed from an aluminum alloy that is hardened by an electrodeposition layer. Thus, as compared to when the female threaded portion 5f is formed from a magnesium alloy as in the conventional art, jamming of the threaded portions can be reduced, and the first side cover 6a can be reliably mounted to the first side plate 5a, because the male threaded portion 65a will rarely fail to properly engage with the female threaded portion 5f.

ALTERNATIVE EMBODIMENTS

Figure 9:
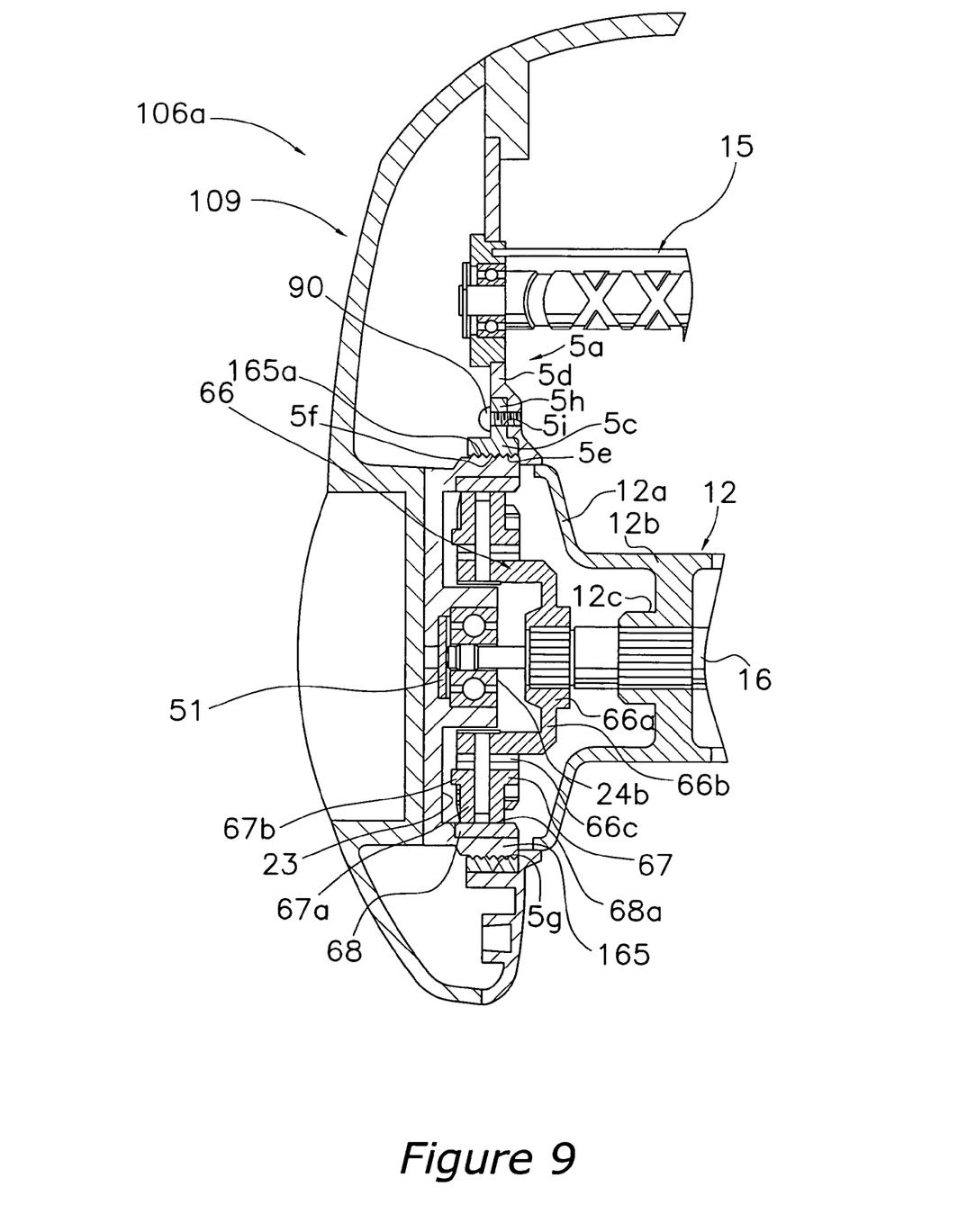
FIG. 9 is a cross-sectional view of the dual bearing reel in accordance with an alternative embodiment of the present invention.
Figure 10:
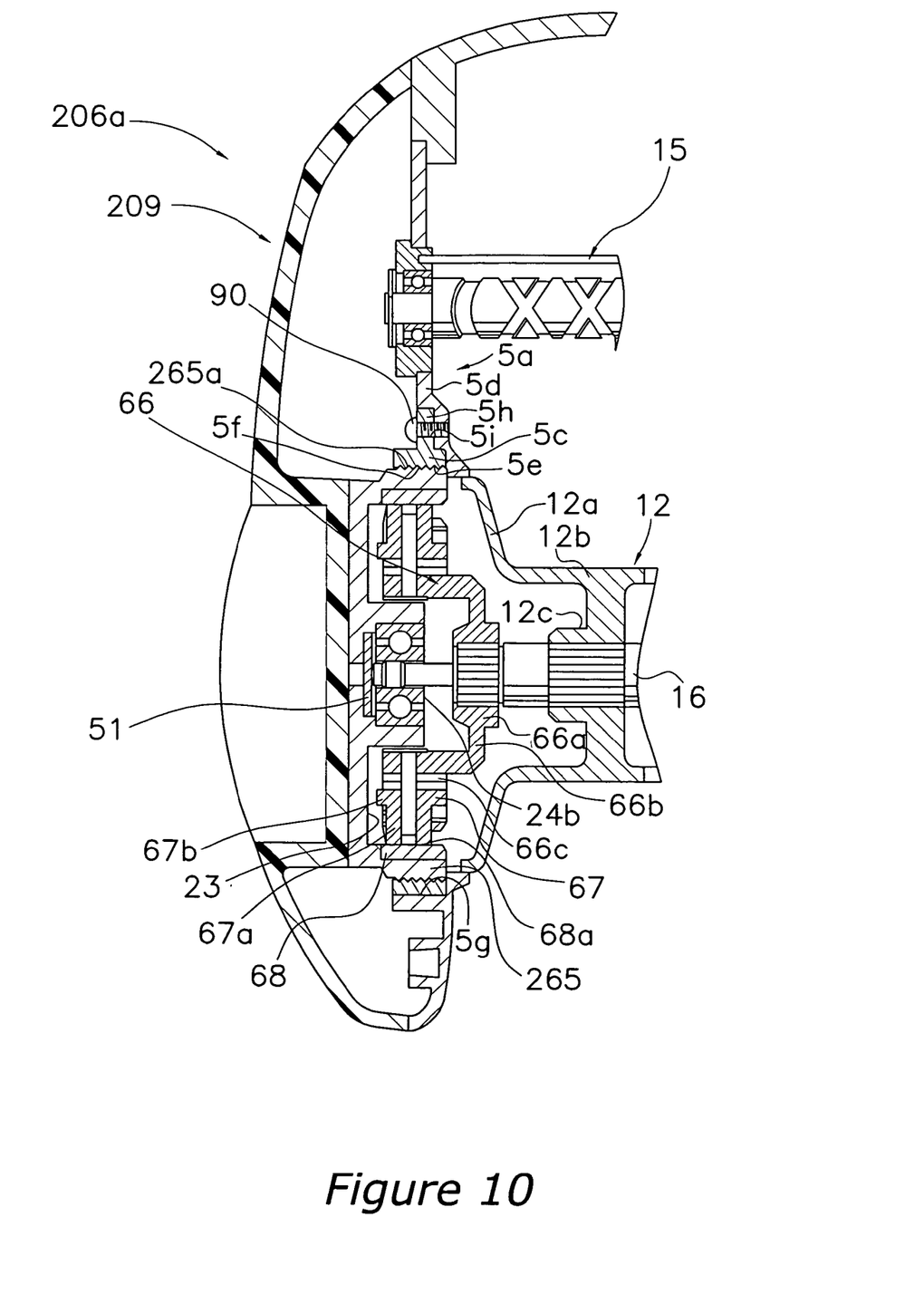
FIG. 10 is a cross-sectional view of the dual bearing reel in accordance with a still alternative embodiment of the present invention.

Referring now to FIGS. 9–10, dual bearing reels in accordance with alternative embodiments will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity.

(a) In the aforementioned embodiment, a low profile type reel used for bait casting was described as an example, but the present invention can be applied to other types of dual bearing reels.

(b) In the aforementioned embodiment, the annular member 5c was made from an aluminum alloy. However, the annular member 5c may be made of another metal or a synthetic resin hardened by an electrodeposition layer. In addition, an alumite treatment and an anodic oxidation treatment were performed on the surfaces of the annular member 5c and the plate member 5d in the aforementioned embodiment. However, the present invention is not limited thereto.

(c) In the aforementioned embodiment, the male threaded portion 65a was formed on the outer peripheral surface of the brake case 65. However, the present invention is not limited to such arrangement. For example, the first side cover 6a may be formed to have a projecting portion in its inner periphery, and a male threaded portion may be formed on an outer peripheral surface of such projecting portion. In addition, as shown in FIG. 9, the first side cover 106a may be formed of two members, a first external cover 109 (another example of the external member) covering the exterior of the first side plate 5a, and a brake case 165 (another example of the internal member) that is provided as a member separate from the first external cover 109 and has the male threaded portion 165a. Here, for example, the first external covers 109 and 209 formed from a magnesium alloy as shown in FIG. 9 or a synthetic resin as shown in FIG. 10, while the brake covers 165 and 265 are formed from an aluminum alloy.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-320665 and 2004-043989. The entire disclosure of Japanese Patent Application Nos. 2003-320665 and 2004-043989 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A dual bearing reel, comprising:
   a reel unit, including;
      a first side plate having
         a plate member which includes a first opening in its inner peripheral portion, the plate member being made of a magnesium alloy, with an electrodeposition treatment being performed on a surface of the plate member, and
         an annular member being at least partially coupled to the first opening and having a second opening and a female threaded portion that is formed on an inner peripheral portion of the second opening, a surface of the annular member being harder than the surface of the plate member on which the electrodeposition treatment is performed;
      a second side plate that is disposed opposite the first side plate across a gap,
      a first side cover that is detachably mounted on the first side plate so as to cover an exterior of the first side plate, the first side cover having a male threaded portion formed thereon that is designed to engage with the female threaded portion of the annular member, and
      a second side cover that is detachably mounted on the second side plate so as to cover an exterior of the second side plate;
   a spool detachably mounted between the first and second side plates for winding fishing line, the spool passing through the second opening;
   a handle mounted on the second side cover to rotate the spool; and
   a drag adjustment member disposed on the same side of the reel unit as the handle.

2. The dual bearing reel set forth in claim 1, wherein the annular member is made of a metal.

3. The dual bearing reel set forth in claim 2, wherein the annular member is made of an aluminum alloy.

4. The dual bearing reel set forth in claim 2, wherein an anodic oxidation treatment is performed on the surface of the annular member.

5. The dual bearing reel set forth in claim 1, wherein the annular member is made of a synthetic resin.

6. The dual bearing reel set forth in claim 1, wherein the electrodeposition treatment is performed on the surface of the plate member after an anodic oxidation treatment is performed thereon.

7. The dual bearing reel set forth in claim 1, wherein the first side cover is made of a metal.

8. The dual bearing reel set forth in claim 7, wherein the first side cover is at least partially made of an aluminum alloy.

9. The dual bearing reel set forth in claim 7, wherein an anodic oxidation treatment is performed on a surface of the first side cover.

10. The dual bearing reel set forth in claim 7, wherein the first side cover further includes an exterior member that covers an exterior of the first side plate, and an interior member that is provided separately from the exterior member and which includes the male threaded portion.

11. The dual bearing reel set forth in claim 10, wherein the exterior member is made of a synthetic resin, and the interior member is made of an aluminum alloy.

12. The dual bearing reel set forth in claim 10, wherein the exterior member is made of a magnesium alloy, and the interior member is made of an aluminum alloy.

13. The dual bearing reel set forth in claim 1, wherein the annular member is mounted to the plate member with a bolt member.

14. The dual bearing reel set forth in claim 13, wherein the annular member includes a plurality of attachment portions that is formed to project radially outward, a through hole being formed in each of the attachment portions, and
the plate member includes a plurality of nut portions that communicates with the through holes of the attachment portions, the bolt member engaging at least one of the nut portions and at least one of the through holes.

* * * * *